May 10, 1938.　　　　　N. B. AKITT　　　　　2,116,817
COUPLER
Filed May 14, 1931　　　　4 Sheets-Sheet 1

INVENTOR
Norman B. Akitt
ATTORNEY

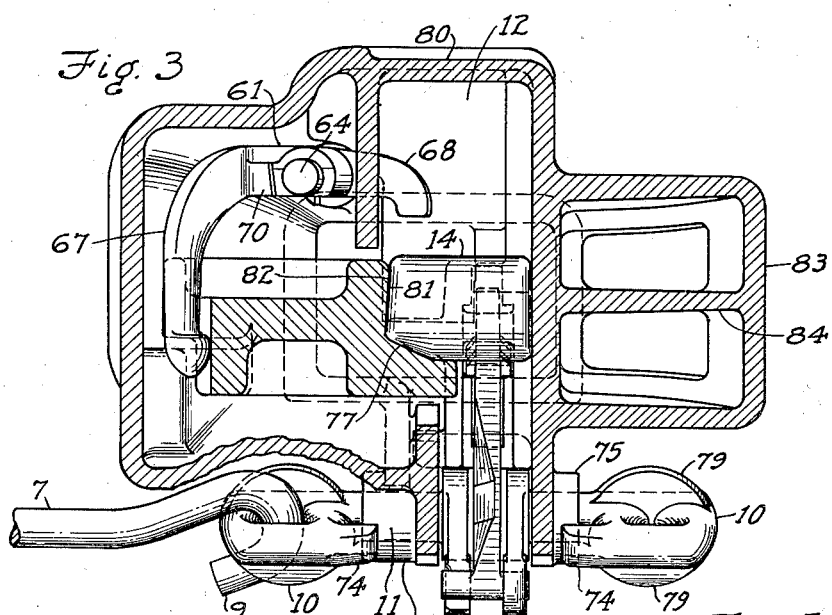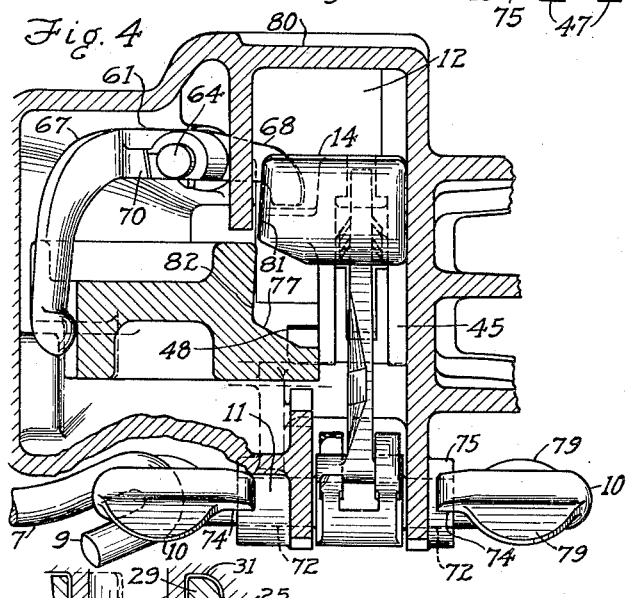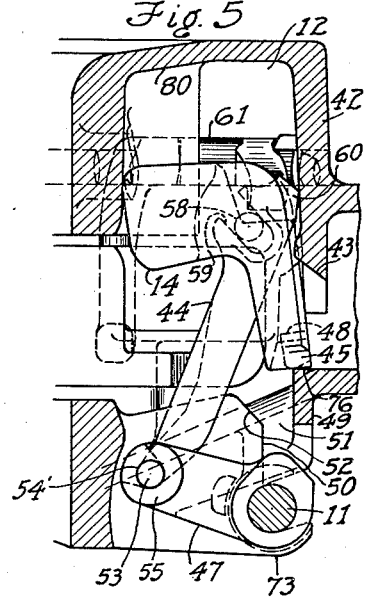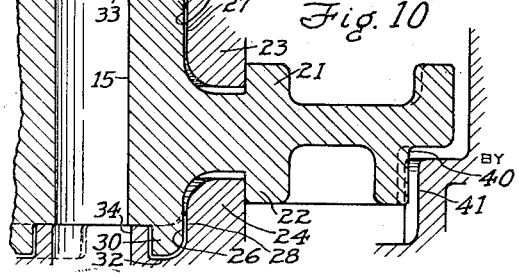

May 10, 1938.   N. B. AKITT   2,116,817
COUPLER
Filed May 14, 1931   4 Sheets-Sheet 3
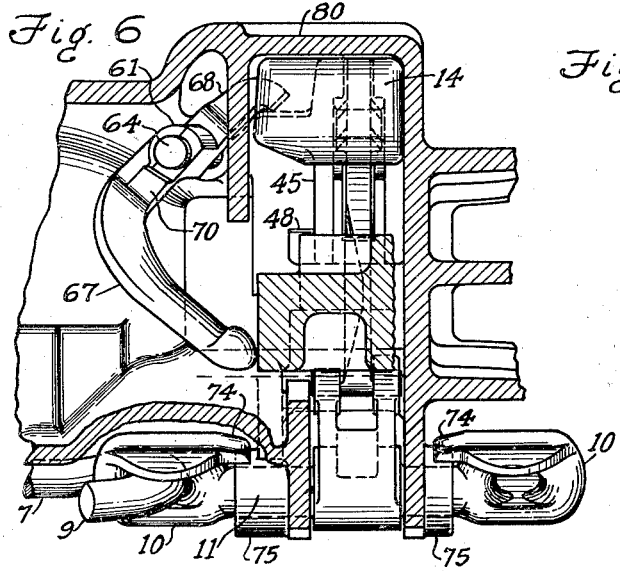
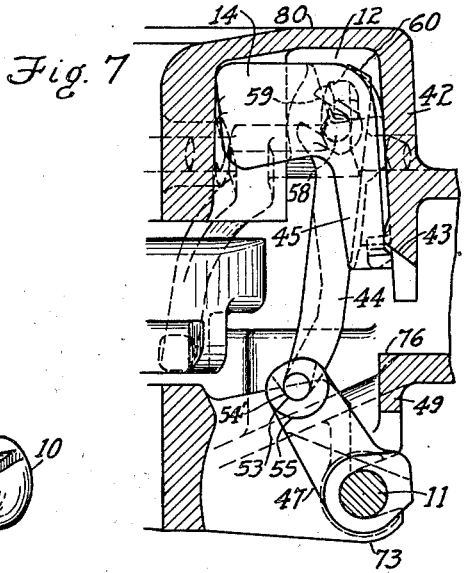
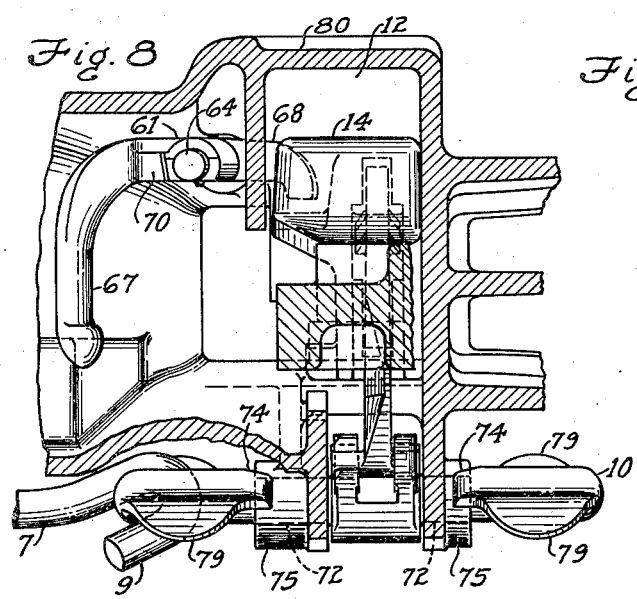
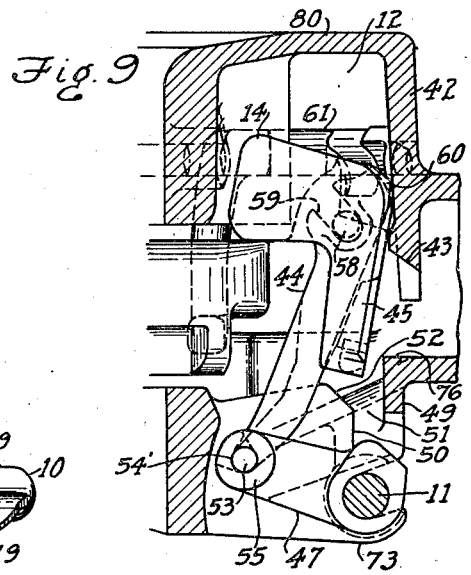
INVENTOR
Norman B. Akitt
BY
ATTORNEY May 10, 1938.　　　　　N. B. AKITT　　　　　2,116,817
COUPLER
Filed May 14, 1931　　　　4 Sheets-Sheet 4
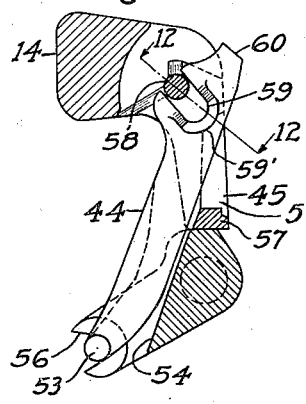
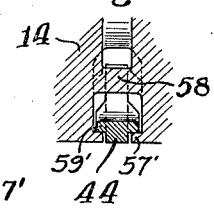
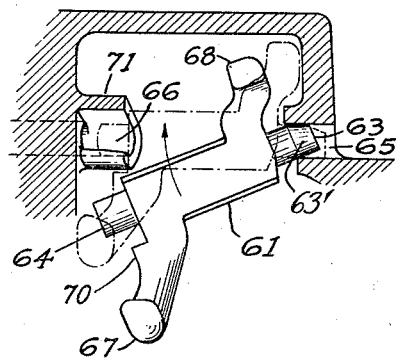
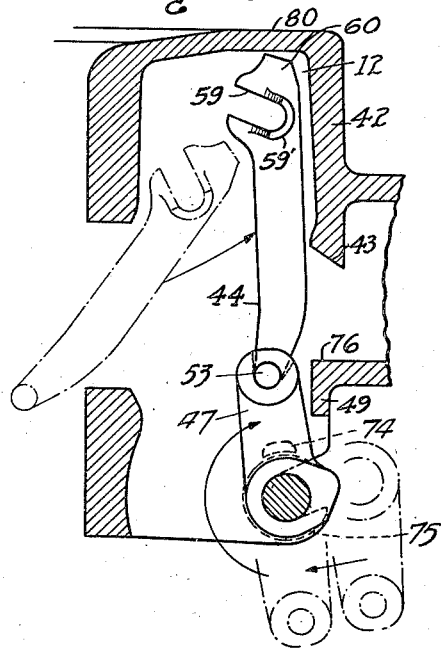
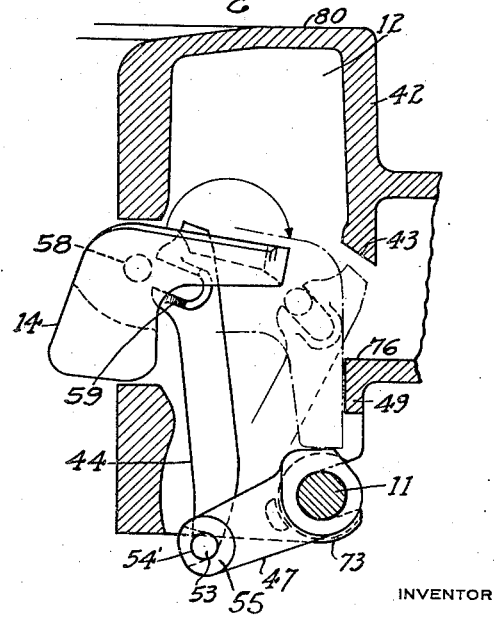
INVENTOR
Norman B. Akitt
BY
ATTORNEY Patented May 10, 1938

2,116,817

UNITED STATES PATENT OFFICE 2,116,817

COUPLER

Norman B. Akitt, Rochester, N. Y., assignor, by mesne assignments, to Gould Coupler Corporation, Rochester, N. Y., a corporation of New York Application May 14, 1931, Serial No. 537,461

16 Claims. (Cl. 213—128)

This invention relates to couplers, and more particularly to automatic couplers adapted for use on railway rolling stock and bottom-operated by means of a transversely extending rocker shaft.

The principal object of my invention, generally considered, is to provide a coupler of the bottom-operated type in which all parts of the mechanism are pivoted, separate pivot pins, however, being eliminated by forming the necessary pivotal portions as trunnions rigid or integral with the associated parts, the coupler operating rod formed with a depending arm serving the purpose of operating the locking mechanism of the coupler, the link for moving the lock being provided with an extension functioning to prevent the lock from jumping out of place when the locked coupler is subjected to severe shocks, the coupler being particularly designed for use in countries foreign to the United States, and especially adapted for such service by reason of its lightness, interchangeability and few parts.

Another object of my invention is to provide an automatic coupler in which the lock thereof is of a vertically movable type engaging a bell-crank lever knuckle opener upon upward movement thereof, the mechanism for operating the lock comprising a rocker shaft, lever and a link connecting said lever to said lock, said link having an anti-jump extension normally underlying a portion of the coupler head to retain the lock in locked position until positively unlocked in the usual way, the parts being so arranged that during the unlocking operation, as the leverage of the knuckle opener decreases, the mechanical advantage of the lever and link increases.

A further object of my invention is to provide an automatic coupler with a vertically movable lock operated by a rocker shaft with an integral lever and a connected link, said lock being positively moved to lock-set position by the link which acts as an inclined strut for urging said lock rearwardly, at the same time preventing it from working out the face of the coupler head.

A still further object of my invention is to provide an automatic coupler in which the parts are pivoted to secure ease of operation and operated by a transversely extending rod provided with a depending arm, said rod upon rotation serving to unlock the coupler.

An additional object of my invention is to provide an automatic coupler with a rocker shaft and integral lever, and a link for operating a vertically movable lock thereof, said rocker shaft being provided with a hub forming a limit stop for the bottom of the lock, and more particularly for depending legs thereof, said lock link being connected to the lock between said legs and serving not only to raise it but to first release the lock-retaining means provided on the lock, and then positively force said lock to lock-set position.

A further object of my invention is to provide an automatic coupler with a knuckle opener provided with integral trunnions serving for the mounting thereof and having an elongated hub, from the front portion of which extends an arm for engaging the tail of the knuckle, and from the rearward portion of which extends another arm for engaging the lock and receiving knuckle operating motion therefrom, the tail of the knuckle and the face of the lock engaged thereby being preferably inclined to avoid lock creepage, said lock, when in locked position, resting in a pocket in, and supported on, the knuckle tail.

Other objects and advantages of the invention relating to the particular arrangement and construction of various parts will become apparent as the description proceeds.

Referring to the drawings illustrating my invention, the scope whereof is defined by the appended claims:—

Figure 3 is a transverse sectional view on the line 3—3 of Figure 1, looking in the direction of the arrows.

Figure 4 is a fragmentary sectional view corresponding to Figure 3, but showing the mechanism in lock-set position.

Figure 5 is a fragmentary sectional view corresponding to Figure 2, but showing the coupler mechanism in lock-set position.

Figures 6 and 7 are fragmentary views corresponding, respectively, to Figures 4 and 5, but showing the parts of the coupler in full open position.

Figures 8 and 9 are fragmentary views corresponding, respectively, to Figures 4 and 5, but showing the parts of the coupler in position to couple with the lock-set off and the knuckle open.

Figure 10 is a fragmentary vertical sectional view on the line 10—10 of Figure 1, looking in the direction of the arrows.

Figure 11 is a fragmentary sectional view on the line 11—11 of Figure 1, looking in the direction of the arrows.

Figure 12 is a fragmentary sectional view on the line 12—12 of Figure 11, looking in the direction of the arrows.

Figure 13 is a fragmentary sectional view on the line 13—13 of Figure 1, but showing the knuckle opener with one of its trunnions being placed in position in the head to illustrate the method of inserting said opener.

Figure 14 is a fragmentary sectional view corresponding to Figure 2, but illustrating the manner of assembling the rocker shaft and link with the head.

Figure 15 is a fragmentary view corresponding to Figure 14, but illustrating the method of assembling the lock with the rocker shaft and link shown in Figure 14.

Figure 1:
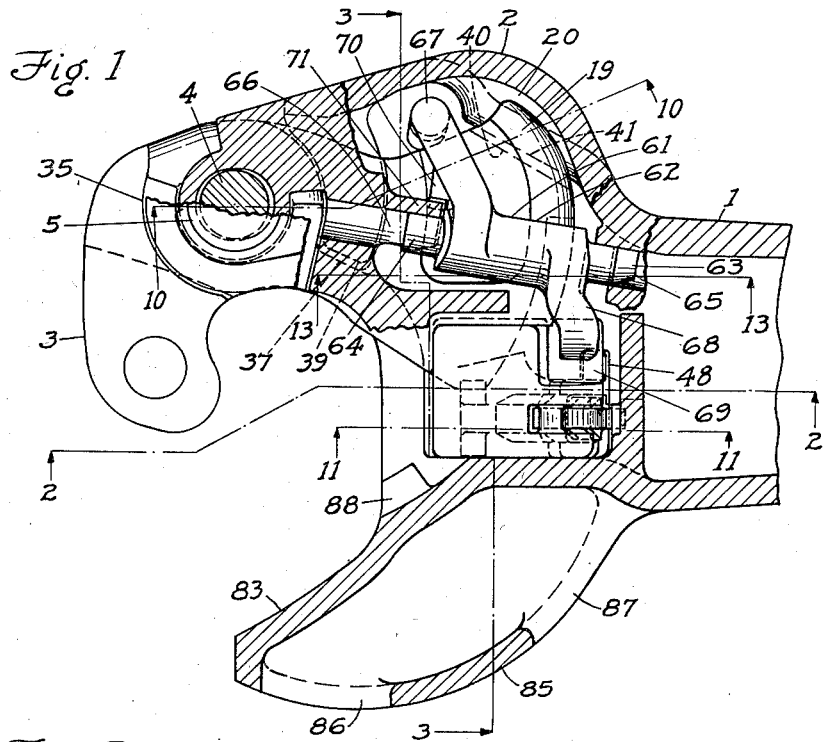
Figure 1 is a plan view of a coupler embodying my invention, a portion thereof being shown in horizontal section with the coupler mechanism in locked position.

The coupler described in the present application is an improvement on that described and claimed in the co-pending application of Willard F. Richards, Serial No. 442,638, filed April 8, 1930, for Couplers, which has matured into Patent No. 2,031,617, granted February 25, 1936. The present coupler eliminates the pivot pins employed in the coupler of said previous application by forming trunnions rigid or integral with the parts, as well as securing other important advantages which will be hereinafter explained in detail.

Referring to the drawings in detail, like parts being designated by like reference characters, there is illustrated a coupler 1 comprising a head 2 and a knuckle 3 pivotally connected to said head by means of a pin 4, as is usual with automatic couplers. The pin is desirably headed at its upper end, as indicated at 5, and may be retained in place by means of a cotter or other securing device (not shown) passing through an aperture 6 in the lower end thereof. The coupler is particularly adapted for service on foreign railways where the curves are sharp and where it is desirable that the employee effecting the coupling and uncoupling operation should not go between the vehicles. For this purpose, the coupler is desirably provided with an uncoupling rod or rods 7 each formed with a handle 8 at its outer end. Said rod is preferably formed with a hook 9 at its inner end for engagement with an eye 10 on a rotor or rocker shaft 11, which, in turn, effects the operation of the coupler upon rotating or turning thereof. The rocker shaft 11 preferably has an eye 10 at each end to provide for operation from either or both ends. Longitudinal movement of the operating rod or rocker shaft has no effect in operating the coupler mechanism, so that said movement may be employed for aligning the coupler with an adjacent coupler so that connection therebetween can be effected, the inner end of the coupler stem (not shown) being for that purpose preferably adapted for angling or pivotal movement with respect to the vehicle underframe.

The coupler head is formed with a downwardly and forwardly opening compartment or pocket 12 adapted to receive through the front opening 13 a vertically movable bottom-operated lock or locking block 14.

The pin 4 which connects the knuckle 3 to the head 2 desirably passes through an aperture 15 in the knuckle and corresponding apertures 16 in the upper pivot lug or ear 17 and lower pivot lug or ear 18 on the head 2. The knuckle 3, as is usual, is provided with a tail 19 received, when in locked position, in a pocket 20 in the head 2.

In order to relieve the knuckle pin 4 of pulling and buffing strains, the knuckle is desirably provided on its tail with pulling shoulders 21 and 22 preferably vertically aligned, as shown in detail in Figure 10, and engaging correspondingly shouldered portions 23 and 24, respectively, on the coupler head. Because of the vertical alignment of the shoulders, the pulling action is equalized. The knuckle is also desirably provided with buffing shoulders 25 and 26 engaging corresponding buffing portions 27 and 28 on the head. The buffing shoulders are also desirably vertically aligned like the pulling shoulders.

In addition to the direct pulling forces, there is a secondary lateral component at the knuckle pin. To resist this lateral pressure, knuckle pin protector shoulders are formed on upstanding and depending annular bosses 29 and 30, respectively, on the knuckle, fitting in corresponding depressions 31 and 32 on the head, and surrounding corresponding head bosses 33 and 34.

As an additional protection for the pin against buffing forces, corresponding buffing shoulders 35 and 36 are provided on the knuckle for engagement with the pivot lugs or ears 17 and 18, respectively. To protect the pin 4 against lateral forces due to eccentricity, shoulders 37 and 38 are provided extending forwardly from the lugs 21 and 22, respectively, and formed on portions which are, in effect, angular extensions of said lugs 21 and 22. These shoulders are adapted to engage corresponding shoulders 39 formed on the lug or wall portions 23 and 24 of the head. In order to limit turning movement of the knuckle inwardly of the head, an abutment or shoulder 40 is desirably provided on the tail of the knuckle and adapted to engage a limit stop shoulder or abutment 41 on the head, as shown most clearly in Figures 1 and 10. The pin 4 desirably has sufficient clearance in the head, as shown in Fig. 1, to make effective the protective features described.

The locking mechanism of the coupler in the present embodiment comprises a lock 14 which is guided for up and down movement in the head by the wall 42 of the head forming the horn of the coupler, said wall being extended below the top wall of the coupler shank and provided at its lower end with a preferably angular shoulder 43 adapted to form a stop ledge for the lock link 44. The lock 14 is desirably provided with a pair of depending legs 45, the preferably connected lower ends of which, in the lowermost position illustrated in Figure 2, rest on the abutment portion or hub 46 of the rocker shaft 11 which carries rigidly connected thereto or integral therewith the lock lever or levers 47.

The leg 45 toward the knuckle side of the head is preferably provided with an outstanding or laterally extending lug or projection 48 disposed between the lower section 49 of the rear wall of the pocket 12 and a lug or inwardly extending portion 50 of the head at the knuckle side thereof, said portion 50 extending toward the guard arm side of the head in front of the projection 48 for guiding the lock, especially during descent, and leaving a channel 51 in which said lug 48 is adapted to move. The upper rear portion of the projection or lug 50 on the head is desirably bevelled, as indicated at 52, to facilitate the guiding operation.

The lock 14 is raised to lock-set or full open position, as indicated, respectively, in Figures 5 and 7, by means of the link 44 pivoted at its lower end to the free end of the lock lever 47, as by means of preferably integral trunnions 53 outstanding from the lower end of said link, said link being received at its lower end in a slot or notch 54 in the lock lever, or between the levers 47, as shown most clearly in Figure 11, one of said trunnions fitting in an aperture 54' in one of the levers or portions of the lever on one side of the notch 54, for example, the lever or portion 55 on the guard arm side of the coupler, and the other trunnion received in a notch or open bearing 56 on the other lever or portion at the knuckle side thereof, in order to make assembly possible. The upper end of the link 44 preferably extends between the legs 45 of the lock 14, as shown most clearly in Figure 11, said legs being desirably connected at their lower ends by a bridge portion 57. The lock 14 is bifurcated, or the space between the legs 45 extended, to provide for the reception of the upper end of the link 44, said bifurcated portions being connected by a rigid, preferably cylindrical, and integral pivot portion 58 normally received in the forwardly and upwardly or diagonally opening notch or slotted portion 59 adjacent the upper end of the link 44, said link being correspondingly widened at the connected portion to accommodate the slot and continued therebeyond to provide an anti-jump extension 60 normally underlying the stop shoulder 43 on the head, as shown most clearly in Figure 2, to prevent undesired upward movement or jumping of the lock from locked position. Corresponding action or creeping of the lock is also desirably prevented by inclining the face 81 of the lock which engages the knuckle tail, as shown in Figure 3, the engaging face 82 of the knuckle tail being correspondingly undercut, as shown. The lower or rearward end of the slotted portion 59 is desirably reinforced by bosses or beading 59' forming shoulders normally engaged by corresponding shoulders on ribbing or reinforcing guide portions 57' on the lock 14 for limiting movement of the lever away from the pivot portion 58 when the lock and lever are in normal relative positions.

For effecting the opening of the knuckle 3, a knuckle opener 61 is provided, said opener taking the form of a bell-crank lever and provided with a longitudinally extended hub portion 62, desirably normally disposed at a slight angle to the longitudinal axis of the coupler, and pivotally mounted in the head 2, about an axis preferably radial with respect to the knuckle pin 4, as by means of rigid, preferably integral, trunnions 63 and 64 outstanding from the ends thereof and received in corresponding bearings 65 and 66 in the head. The forward end of the hub portion 62 is provided with an angular arm or kicker 67, the lower or depending portion of which normally lies adjacent the lower portion of the tail 19 of the knuckle 3 for effecting the opening operation thereof. The rear portion of the hub 62 is formed with a transversely extending arm 68 which fits in a depression or notch 69 in the top of the lock 14 and is engaged by said lock upon upward movement thereof for effecting the opening of the knuckle, as indicated particularly in Figures 4 and 6. The parts are preferably designed so that the thrower follows the knuckle to full open position, making it unnecessary to depend on knuckle momentum.

Inasmuch as the present form of coupler eliminates all separate pivot pins, except the knuckle pin 4, and provides instead trunnions cast integral with the parts, a novel manner of assembly is necessitated which is preferably substantially as follows: The knuckle opener 61 is first inserted, as shown in Figure 13, by entering it through the front opening 13 in the head and moving it rearwardly and upwardly until the trunnion 63, having an end portion tapered as indicated at 63' to provide clearance for movement to assembled position, slides into the bearing pocket 65. Then the opener is moved upwardly to engage the forward trunnion 64 in its bearing pocket 66, after which said opener is rotated clockwise, as viewed from the front, until the kicker or depending arm 67 is adjacent the knuckle side of the head, the lateral lug or extension 70 on said opener, during the rotary operation, passing back of the wall 71 in which the bearing 66 is provided, thereby effecting an interlock between the knuckle opener and head and avoiding unintentional dislodgment thereof.

The rocker shaft 11 and connected lock lever 47 is then applied by fitting the trunnion or journal portions 72 of said rocker shaft into the rearwardly opening U-shaped pivot lugs 73 which are preferably cast integral on the bottom of the head, said rocker shaft being inserted, when the lever is depending therebelow, and after insertion moved clockwise, as shown in Figure 14, which movement effects an interlock between the inwardly extending lugs 74 on the rocker shaft and the outstanding hub flanges or collars 75 on the pivot lugs 73, as shown most clearly in Figures 3 and 14. After rotating clockwise until the lock lever stands in a nearly vertical position, as shown in Figure 14, the link 44 is then inserted through the front opening 13 and its integral pivots or trunnions 53 fitted to the corresponding bearing pockets 54' and 56 of the lock lever 47, as previously described. The rocker shaft and its lever and connected link are then rotated counterclockwise to the position shown in Figure 15, so that the lock 14 can be inserted through the front opening 13 and applied over the upper end of the link 44 with its pivot portion 58 received in the slot or inclined notch 59 in the link. The rocker shaft is then rotated to place the lock in lock-set position, as shown in Figure 5, so that the knuckle can be inserted in the customary manner, the knuckle pin being finally inserted to complete the assembly. In this way, each successive part locks in place the previous part, and the application of the knuckle pin completes this interlocking of parts, so that they cannot be unintentionally displaced.

Figure 2:
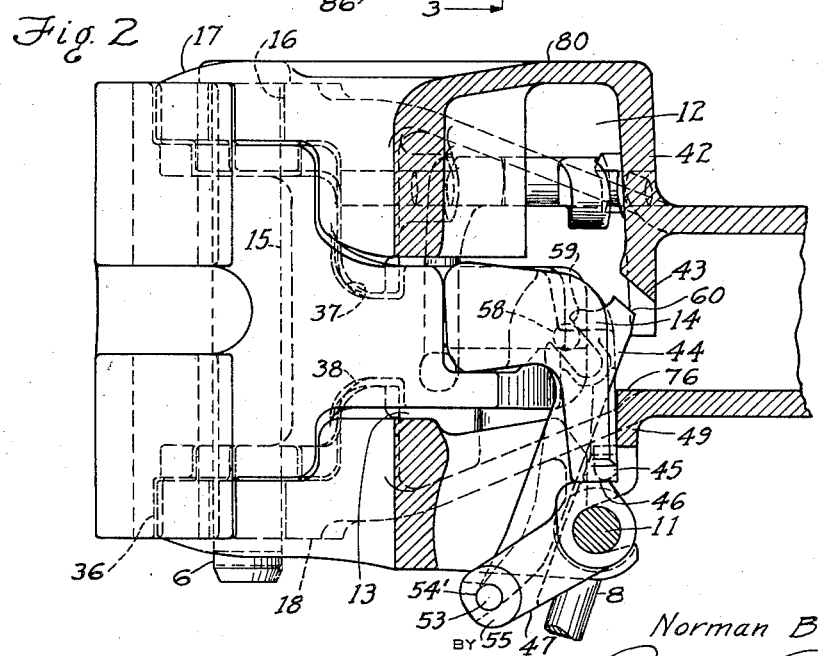
Figure 2 is a vertical sectional view of the coupler head on the line 2—2 of Figure 1, looking in the direction of the arrows, the lock and mechanism associated therewith being illustrated in side elevation.

The operation of the coupler of the present embodiment of my invention is as follows, starting with the lock and associated parts in closed or locked position. When in such position, as illustrated in Figures 1, 2 and 3, not only is the lock held down by gravity, but it is positively locked or retained by the extension 60 underlying the shoulder 43 on the head. On rotating the rocker shaft 11 clockwise, as viewed in Figure 2, the lock lifter or link 44 first rotates counterclockwise about the trunnions 53 as it moves upward until the anti-jump extension 60 passes from beneath the shoulder 43, the inclined slot 59 permitting the link to ride up on the pivot portion 58 of the lock until said extension is clear of the shoulder 43, whereby, upon further turning of the rocker shaft, the lower end of the slotted portion of the link 44 engages the pivot portion 58 and raises the lock bodily, thereby releasing the tail of the knuckle, and finally reaching the position shown in Figures 4 and 5, when the lock legs 45 engage and rest on a lock-set ledge 76 which is preferably formed at the top of the section 49 of the rear wall of the pocket 12, whereby said lock is held in lock-set position and the knuckle may be opened, if desired.

On account of the cam shape of the hub forming the abutment portion 46 on the rocker shaft, a camming action takes place between said abutment and the legs 45 of the lock, resulting in a slight upward movement of said lock immediately upon turning of the rocker shaft, thereby initially transmitting the necessary force to overcome the inertia and friction of the lock on the knuckle tail, initiating the disengagement of the anticreep faces 81 and 82 releasing the pressure between the pivot portion 58 and the slotted portion 59 of the link, and facilitating sliding of the link on said pivot portion, while at the same time minimizing wear therebetween.

If the rocker shaft 10 is turned further in the same direction, that is, clockwise, as viewed in Figure 5, the adjacent arm 68 of the bell-crank lever or knuckle opener 61 will be engaged by the top of the lock 14 in the notch 69 therein, and moved so that the other arm 67 of said knuckle opener engages the tail 19 of the knuckle, and moves it to open position. After the knuckle has been opened and the lock lever 47 allowed to return to normal position, the legs 45 of the lock would first engage the lock-set ledge 76 if it were not for the tail 19 of the knuckle, which engages the forward portion of the lock, as shown in Figure 9, and prevents said lock from assuming a lock-set position. When the knuckle is closed, the lock, when released, will drop to locked position, where it is supported not only by its legs engaging the abutment portion 46 on the rocker shaft, but also by the lower portion thereof engaging a shelf or ledge portion 77 on the tail of the knuckle, the upper surface of which slopes from the undercut or anticreep surface 82 to a normally horizontal surface or portion adapted to supportingly engage the approximately central part of said lock, as shown most clearly in Figure 3. If the tail of the knuckle is out of the way, as when the knuckle is in locked position, as shown, for example, in Figures 4 and 5, the lock, when raised or lowered until it reaches the position shown in Figure 5, will result in the legs 45 engaging the lock-set ledge 76, because the forward portion of the lock overbalances the weight of the legs about the pivotal axis 58, causing said legs to swing rearwardly to engagement with the lock-set ledge. When the knuckle is open, as shown in Figures 8 and 9, the tail of the knuckle underlies the forward portion of the lock 14, so that said legs 45 are withdrawn from the lock-set ledge 76, allowing the lock to drop to locked position when the knuckle reaches a corresponding position.

From the foregoing disclosure, it will be apparent that I have devised a coupler of few parts and simple construction, which especially adapts it for foreign passenger service, although it will be obvious it is not limited to such use. The lock is bottom-operated by rotation of a transversely extending rod and connected rocker shaft, which shaft preferably has eye portions 10 for convenient connection of the rod thereto, an eye portion being desirably provided at each end so that the coupler may be operated from either side of the car or other railway vehicle. Each eye portion is desirably formed with outstanding flanges or ribs 79 lying on the clockwise side of the eyes, as viewed in Figure 2, so that they will be engaged by the hooked connected end of the corresponding operating shaft or rod 7 and minimize lost motion therebetween. In other words, these flanges or ribs serve as abutments for the connected end of the corresponding operating rod to facilitate operation of the coupler and minimize lost motion therebetween, the absence of said ribs on the opposite sides of the eyes resulting in the provision of a corresponding amount of lost motion, so that when the coupler is operated from one side of the car, the handle of the operating rod at the other side will not move to the same extent, if at all, as the handle which is grasped in the hand of the operator. This is a safety provision, as if the handle at the opposite side of the car was moved, the safety of a trainman in proximity thereto might be endangered. On account of being pivoted on the coupler, only one additional bracket (not shown) is required for each uncoupling rod.

In order to limit downward movement of the lock, not only do the legs 45 normally rest on the hub or abutment 46, but the main portion or body of the lock is directly supported on a ledge formed on the tail of the knuckle, as shown most clearly in Figure 3. Although the lock is supported in this embodiment by a ledge or flange extending under the lock, it will be understood that, if desired, a corresponding support may be provided by forming a ledge extending from the lock over the tail of the knuckle.

The upper portion of the head 2 is desirably closed, as indicated at 80, to prevent the entrance of water and other undesired foreign matter. The lock lever 47 being integral with the rocker shaft, and all pivotal connections except that between the knuckle and head being provided by integral trunnions, effects a reduction in the normal number of parts, there being but seven essential parts, namely, the head 2, knuckle 3, lock 14, knuckle opener 61, knuckle pin 4, lock lifter link 44, and rocker shaft or rotor 11, not mentioning the operating rod for the rocker shaft.

The operation of the coupler is greatly facilitated by pivotally connecting all the parts of the mechanism and having the knuckle opener and the lock lever and link so proportioned that when the leverage of the operating portion 68 of the knuckle opener decreases as the end of the kicker portion 67 travels down the engaged side of the knuckle tail, as shown in Figs. 4 and 6, so that ordinarily the force transmitted to said kicker portion becomes relatively small, such force is increased by the increase of mechanical advantage of the toggle formed by the lock lever and lock link coming into approximate alignment, so that the resultant force transmitted from the kicker to the tail of the knuckle is maintained approximately constant with the application of a constant operating force to the rod 7.

The body of the coupler is designed with cross-sectional areas to provide adequate strength for each definite purpose, special attention being given to the area through the coupler face and the section through the guard arm 83. Said guard arm is, in the present embodiment, formed box-shaped at its center section, as shown most clearly in Figure 3, and provided with a central reinforcing rib 84. In order to provide for core removal and for lightening the weight of the head, the outer web 85 may be apertured, as indicated at 86 and 87. Adjacent the guard arm 83, desirably at the outer opening 13 to the mechanism pocket 12, a lug 88 is formed providing a stop shoulder limiting outward swinging movement of the knuckle.

Although I have described a preferred embodiment of my invention, it will be understood that modifications may be made within the spirit and scope of the appended claims.

I claim:—

1. In combination, a coupler head, a knuckle rotatably mounted on said head, a lock for the knuckle, and operating means for said lock comprising a rocker shaft pivotally mounted on the under side of said head and having an arm extending forwardly from its pivotal axis, and a link pivotally connected to said arm and movably connected to said lock, said link being provided at its lower end with oppositely disposed trunnions rigidly connected thereto, and said arm being provided at its forward end with spaced portions forming bearings for respectively receiving said trunnions, one only of said bearing portions being open on one side to permit the introduction of the trunnion associated therewith, the connection between said link and lock preventing disconnecting movement between said link and arm.

2. In combination, a coupler head, a knuckle rotatably mounted with respect thereto, a lock for the knuckle, and operating means for said lock comprising a rocker shaft having an arm extending therefrom, lugs depending from the under side of said head and provided with rearwardly opening hooks receiving the rocker shaft and providing bearings therefor, said hooks being provided with outstanding flange portions and said rocker shaft being formed with eyes having side portions extended toward one another to form lugs overlying and interlocking with said flange portions upon insertion of the shaft in place and turning to normal position, and means for effecting transfer of motion between said arm and lock.

3. In combination, a coupler head, a knuckle rotatably mounted on said head, a lock for the knuckle, and operating means for said lock comprising a rocker shaft having an arm extending forwardly from its pivotal axis, and means for transmitting motion from said arm to said lock, said coupler head being provided on its under side with a plurality of lugs formed with rearwardly opening recesses for receiving said shaft, and said shaft member having portions at opposite ends which are apertured to form eyes to receive an operating member and provided with lugs extending from side portions defining said eyes and normally overlap and embrace said first-mentioned lugs therebetween to retain said shaft in assembled relation with respect to said lugs.

4. In combination, a coupler head, a knuckle rotatably mounted with respect to said head, a lock for the knuckle, and operating means for the lock comprising a rocker shaft having an arm extending from its pivotal axis, and a link, said link being formed with integral trunnions at its lower end, the free end of said arm having bearing recesses normally receiving said trunnions, one only of said recesses being open on one side to permit assembly of the link, the upper end of said link being movably connected to the lock and said shaft being pivotally mounted on the head, the connection between said link and lock preventing disconnecting movement between said link and arm.

5. In combination, a coupler head, a knuckle rotatably mounted on said head, a lock for the knuckle, and operating means for said lock comprising a member pivotally mounted on the under side of said head and having an arm extending forwardly from its pivotal axis, and a link connected to said arm and to said lock, said link and arm being pivotally connected by cooperating means respectively secured integrally thereto, said means involving a pair of trunnions, a full cylindrical bearing cooperating with one trunnion, and a notched portion cooperating with the other trunnion, the connection between said link and lock preventing disconnecting movement between said link and arm.

6. In combination, a coupler head, a knuckle pivotally mounted thereon, a lock, and operating means for said lock comprising a rocker shaft, a lever rigid therewith, and a link disposed between said lever and lock for effecting operation of the latter, said link having an open-ended slot receiving a pivot portion on the lock, the lower end of said slot engaging said pivot portion upon raising the link a predetermined amount, and normally-engaging shoulders on said link and lock to prevent undesired disconnection.

7. In combination, a coupler head, a knuckle pivotally mounted thereon, a lock for said knuckle, and operating means for said lock comprising a rocker shaft, a lever movable with said shaft, and a link for transmitting motion between said lever and lock, said link having a diagonally extending notch near its upper end, said lock having a pivotal portion normally received in said notch, the notched end of said link being normally received in a slot in the lock, the lower portion of said link slot being reinforced by outwardly extending bosses, and inwardly extending reinforcing portions partially closing the lock slot and engaging the link bosses for limiting relative motion between said link and lock.

8. In combination, a coupler head, a knuckle, a lock for said knuckle, and means for operating said lock comprising a link normally extending upwardly and rearwardly from the front end of an operating arm and formed with a widened portion intermediate the ends thereof, said widened portion having a notch opening forwardly and upwardly, said lock being formed with an integral pivot portion normally received in said notch and adapted for either pivotal or sliding movement with respect to said link, said link being extended upwardly beyond said notch and normally underlying a shoulder on the head to prevent undesired upward movement of the lock.

9. In combination, a vertically movable coupler lock, and a link for operating said lock, said link having a diagonally extending notch near its upper end, said lock having a portion normally received in said notch, the notched end of said link being normally received in a slot in said lock, the part of said link adjacent the lower end of said notch having outwardly extending portions providing shoulders, the slotted part of said lock being provided with inwardly extending portions providing shoulders partially closing the slot, and normally engaging the shouldered portions on the link for preventing undesired disconnection.

10. In combination, a coupler head, a knuckle rotatably mounted on said head, a lock for the knuckle, and operating means for said lock comprising a rocker member associated with the underside of said head and having an arm extending therefrom, said rocker member and head being pivotally connected by having one of said members formed with hooks cooperating with a cylindrical portion on the other, said rocker member having eyes, side portions of which are continued to form lugs extending from both ends toward one another, overlying outwardly extending annular rib portions on the head and embracing them therebetween, and a link connected to said arm and to said lock.

11. In combination, a coupler head, a knuckle rotatably mounted on said head, a lock for the knuckle, said head being formed with an opening in the lower wall thereof, said lock being provided with a body and downwardly extending leg which projects through said opening when the lock is in lowered position, and operating means for said lock comprising a member pivotally mounted on the underside of said head and a link movably connected to said lock and to said pivoted member, said knuckle having a portion with a normally horizontal upper surface extending, as far as the longitudinal central plane of said lock, under said body and supportingly engaging the latter, in the plane of the juncture between body and leg, when in locked position, and said leg engaging and being supported by said pivoted member when said lock is in locked position.

12. In combination, a coupler head, a knuckle rotatably mounted thereon, a lock for the knuckle, said head being formed with an opening in the lower portion thereof, said lock having a body portion and a downwardly extending leg projecting through said opening when the lock is in lowermost position, and operating means for said lock and knuckle, said knuckle having a tail underlying and pocketed to receive said lock when in locked position, the side wall of said tail pocket being undercut and normally engaging a correspondingly inclined face of the lock to avoid creeping, and the upper surface of the lower wall of said pocket sloping from the undercut wall, extending as far as the longitudinal central plane of said lock, and terminating in a portion with a normally horizontal surface adapted to supportingly engage the lower surface of said lock in the plane of the junction between body and leg portions.

13. In combination, a coupler head, a rotatably mounted knuckle, a vertically movable lock for said knuckle, a rotor for operating said lock, and means for connecting said rotor and lock, said rotor having journal portions normally engaging open-sided bearings on the head, at least one end of said rotor being formed with an eye for interlocking with an operating rod, and an element of said eye, and a corresponding portion adjacent the other end of said rotor, being extended toward the opposite end of the rotor to overlie a portion of the adjacent bearing for preventing undesired removal of said rotor when in normal position.

14. In combination, a coupler head, a knuckle, a lock for said knuckle, and means for operating said lock comprising a link with a widened portion intermediate the ends thereof, said widened portion having a notch opening forwardly and upwardly, said lock being formed with an integral pivot portion, normally received in said notch and adapted for either pivotal or sliding movement with respect to said link, said link having a shoulder upwardly and rearwardly of, and extending generally parallel to, said notch, said shoulder normally underlying an abutment face on the head, disposed at a substantially corresponding inclination, to prevent undesired upward movement of the lock.

15. In combination, a coupler head, a knuckle rotatably mounted on said head, a lock for said knuckle comprising a body portion and a leg depending therefrom, and operating means for said lock comprising a link connected thereto, and adapted to be moved up and down in said head, said knuckle having a portion with a normally horizontal upper surface, extending as far as the longitudinal central plane of said lock, under and supportingly engaging the lower surface of the body of the latter when in locked position.

16. In combination, a coupler head, a knuckle rotatably mounted thereon, a lock for said knuckle having a body portion, and operating means for said lock and knuckle, said knuckle having a tail underlying and pocketed to receive said lock when in locked position, the side wall of said tail being undercut and normally engaging a correspondingly inclined face of the lock to avoid creeping, and the upper surface of the lower wall of said pocket sloping from the undercut wall, extending as far as the longitudinal central plane of said lock, and terminating in a portion with a normally horizontal surface adapted to supportingly engage the lower surface of said lock body portion.

NORMAN B. AKITT.